(12) United States Patent
Rajasekaran

(10) Patent No.: US 11,603,970 B1
(45) Date of Patent: Mar. 14, 2023

(54) SOLAR LAMP WITH INSECT CONTROL TRAP

(71) Applicant: E. MISHAN & SONS, INC., New York, NY (US)

(72) Inventor: Mohan Rajasekaran, Watertown, CT (US)

(73) Assignee: E. Mishan & Sons, Inc., New York, NY (US)

( * ) Notice: Subject to any disclaimer, the term of this patent is extended or adjusted under 35 U.S.C. 154(b) by 0 days.

(21) Appl. No.: 17/585,045

(22) Filed: Jan. 26, 2022

Related U.S. Application Data

(63) Continuation-in-part of application No. 29/823,556, filed on Jan. 18, 2022.

(51) Int. Cl.
*F21S 9/03* (2006.01)
*F21V 23/00* (2015.01)
(Continued)

(52) U.S. Cl.
CPC ............ *F21S 9/03* (2013.01); *F21V 19/0015* (2013.01); *F21V 21/0824* (2013.01);
(Continued)

(58) Field of Classification Search
CPC .... F21S 9/03; F21V 19/0015; F21V 21/0824; F21V 23/003; F21V 23/04
See application file for complete search history.

(56) References Cited

U.S. PATENT DOCUMENTS

| 4,959,923 A | 10/1990 | Aiello et al. |
| 5,259,153 A | 11/1993 | Olive et al. |

(Continued)

*Primary Examiner* — Bryon T Gyllstrom
(74) *Attorney, Agent, or Firm* — Notaro, Michalos & Zaccaria P.C.

(57) ABSTRACT

A solar lamp has illumination functionality and insect control functionality. The lamp has a main body comprising a main housing, a rechargeable battery housed within lamp for powering the electronic functions of the lamp, device electronics housed within the lamp for controlling the electronic functions of the lamp in a plurality of states comprising an OFF state and an ON state, and a support attached to the lamp, the support containing solar cells for harvesting solar energy and recharging the rechargeable battery and also for detecting a level of ambient light. A transparent panel is disposed at a front of the main body, the panel disposed over a printed circuit board (PCB) on which are disposed a plurality of high-power LEDs for illumination. One or more extension housings are attached to the main body, each extension housing containing an inner grid and an outer grid for electrocuting insects and one or more insect-attracting lights for emitting insect-attracting wavelengths of light. A manual electrical switch is disposed on the lamp for manually selecting a state from the plurality of states. The solar cells, rechargable battery, manual electrical switch, inner grid, outer grid, insect-attracting lights and high-power LEDs are electrically and operatively connected to the device electronics. When the OFF state is selected by the manual electrical switch, the inner grid, outer grid, insect-attracting lights and high-power LEDs are off. When the ON state is selected, the inner grid, outer grid, and insect-attracting lights are on, and if the solar cells are detecting a level of ambient light below a predetermined level, the high-power LEDs are also on.

6 Claims, 8 Drawing Sheets

(51) Int. Cl.
  *F21V 23/04*   (2006.01)
  *F21V 21/08*   (2006.01)
  *F21V 19/00*   (2006.01)
  *F21Y 115/10*  (2016.01)

(52) U.S. Cl.
  CPC ............ *F21V 23/003* (2013.01); *F21V 23/04* (2013.01); *F21Y 2115/10* (2016.08)

(56) References Cited

U.S. PATENT DOCUMENTS

| | | |
|---|---|---|
| 5,301,456 A | 4/1994 | Jobin et al. |
| 6,421,952 B1 | 7/2002 | Vascocu |
| 6,568,124 B1 | 5/2003 | Wilbanks |
| 6,594,946 B2 | 7/2003 | Nolen et al. |
| 6,618,984 B1 | 9/2003 | Li |
| 8,327,577 B2 | 12/2012 | Liang |
| 8,424,239 B1 | 4/2013 | Gallo |
| 8,514,094 B2 | 8/2013 | Richmond |
| 9,326,497 B2 | 5/2016 | Rocha |
| 9,353,938 B2 | 5/2016 | Richmond |
| 9,883,667 B2 | 2/2018 | Lee et al. |
| 10,051,851 B2 | 8/2018 | Hariyama et al. |
| 10,104,879 B2 | 10/2018 | McGowan et al. |
| 10,188,091 B2 | 1/2019 | Home |
| 10,823,350 B1 | 11/2020 | Richmond |
| 10,986,828 B1 | 4/2021 | Studer et al. |
| 11,002,417 B2 | 5/2021 | Rubel |
| 2007/0107298 A1 | 5/2007 | Miao |
| 2007/0144056 A1 | 6/2007 | Gleason, Jr. |
| 2007/0175085 A1 | 8/2007 | Chen |
| 2009/0038207 A1 | 2/2009 | Lin |
| 2009/0175046 A1* | 7/2009 | Richard ................ F21V 21/002 439/577 |
| 2009/0277073 A1 | 11/2009 | Chen |
| 2011/0299272 A1* | 12/2011 | Ko .......................... F21V 15/01 362/183 |
| 2013/0027918 A1* | 1/2013 | White .................... F21S 19/00 362/249.02 |
| 2014/0218901 A1* | 8/2014 | Richmond .............. G10K 1/07 362/183 |
| 2014/0362560 A1* | 12/2014 | Formico ................. F21V 15/01 239/302 |
| 2015/0144713 A1* | 5/2015 | Formico ............. A01M 1/2044 239/289 |
| 2017/0094960 A1* | 4/2017 | Sasaki ................... A01M 1/023 |
| 2018/0231195 A1* | 8/2018 | Hoffman ............... F21V 23/003 |
| 2019/0208760 A1* | 7/2019 | Towne .................... F21V 23/04 |
| 2019/0307114 A1 | 10/2019 | Cajigas et al. |
| 2020/0053998 A1 | 2/2020 | Plain |
| 2020/0340638 A1* | 10/2020 | Rubel ..................... A01M 1/04 |
| 2020/0375168 A1 | 12/2020 | Kaye |
| 2020/0404898 A1 | 12/2020 | McMillan |
| 2022/0341554 A1* | 10/2022 | Xu ........................ F21V 33/008 |

\* cited by examiner

US 11,603,970 B1

SOLAR LAMP WITH INSECT CONTROL TRAP

CROSS-REFERENCE TO RELATED APPLICATIONS

This application is a continuation-in-part of U.S. patent application Ser. No. 29/823,556, filed Jan. 18, 2022, the entire disclosure of which is hereby incorporated by reference for all purposes.

FIELD AND BACKGROUND OF THE SUBJECT TECHNOLOGY

The subject technology relates to lamps for illumination or decorative lighting, or landscape lighting, which may be powered by solar energy collected by solar cells and stored in a rechargeable battery to power light-emitting diodes ("LEDs") to emit light. The subject technology also relates to electric insect control traps.

SUMMARY OF THE SUBJECT TECHNOLOGY

According to an aspect of the subject technology, a lamp incorporates, in a single device, the features of a solar lamp and an electrical insect control trap.

According to a non-limiting embodiment of the subject technology, a solar lamp has illumination functionality and insect control functionality. The lamp has a main body comprising a main housing, a rechargeable battery housed within lamp for powering the electronic functions of the lamp, device electronics housed within the lamp for controlling the electronic functions of the lamp in a plurality of states comprising an OFF state and an ON state, and a support attached to the lamp, the support containing solar cells for harvesting solar energy and recharging the rechargeable battery and also for detecting a level of ambient light. A transparent panel is disposed at a front of the main body, the panel disposed over a printed circuit board (PCB) on which are disposed a plurality of high-power LEDs for illumination. One or more extension housings are attached to the main body, each extension housing containing an inner grid and an outer grid for electrocuting insects and one or more insect-attracting lights for emitting insect-attracting wavelengths of light. A manual electrical switch is disposed on the lamp for manually selecting a state from the plurality of states. The solar cells, rechargable battery, manual electrical switch, inner grid, outer grid, insect-attracting lights and high-power LEDs are electrically and operatively connected to the device electronics. When the OFF state is selected by the manual electrical switch, the inner grid, outer grid, insect-attracting lights and high-power LEDs are off. When the ON state is selected, the inner grid, outer grid, and insect-attracting lights are on, and if the solar cells are detecting a level of ambient light below a predetermined level, the high-power LEDs are also on.

According to a further non-limiting embodiment of the subject technology, the solar lamp has a motion detector, and detection of motion is an additional prerequisite for activating the high-power illumination LEDs.

DETAILED DESCRIPTION OF THE SUBJECT TECHNOLOGY

Figure 1:
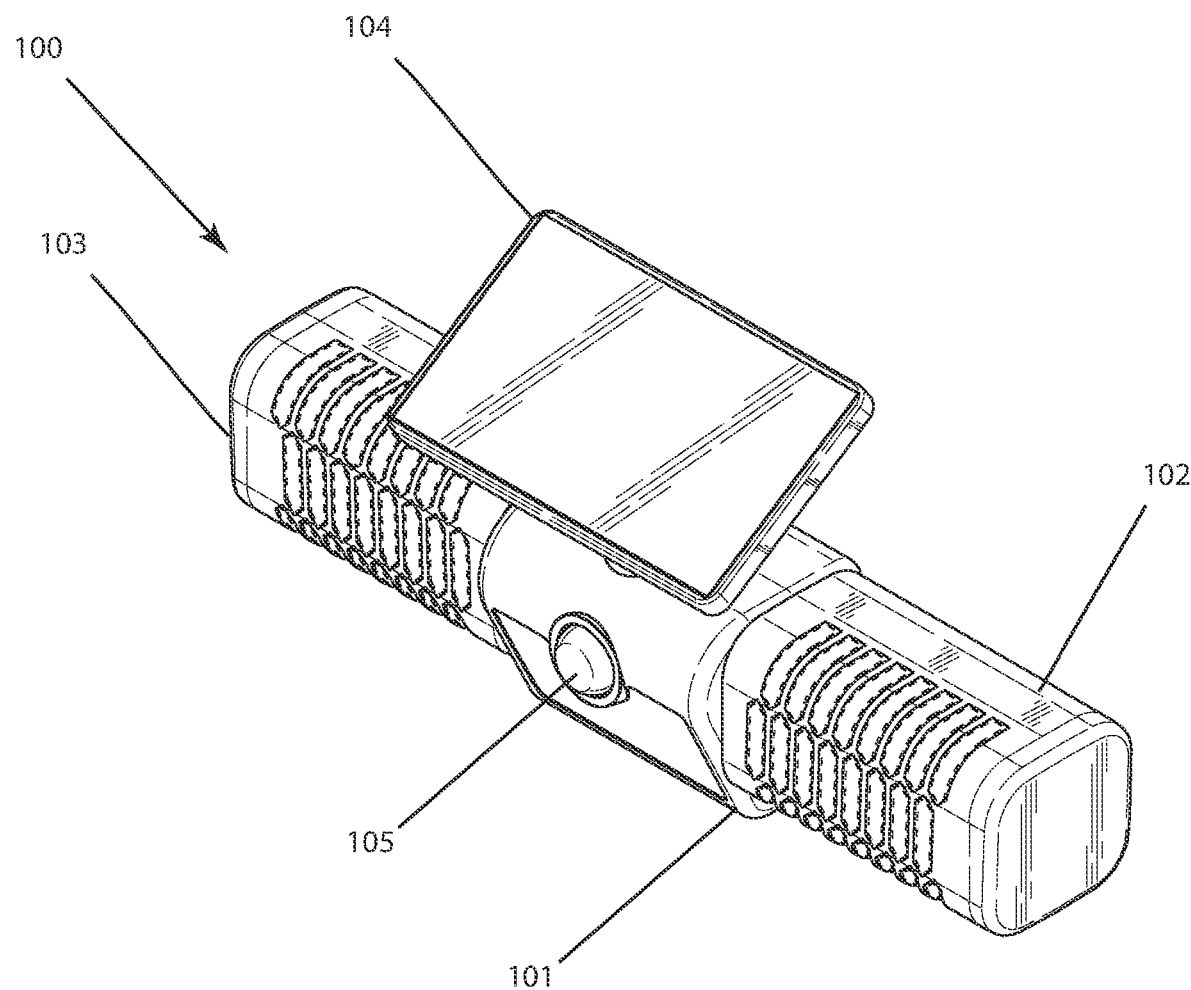
FIG. 1 is a perspective view of a lamp according to a non-limiting embodiment of the subject technology.
Figure 2:
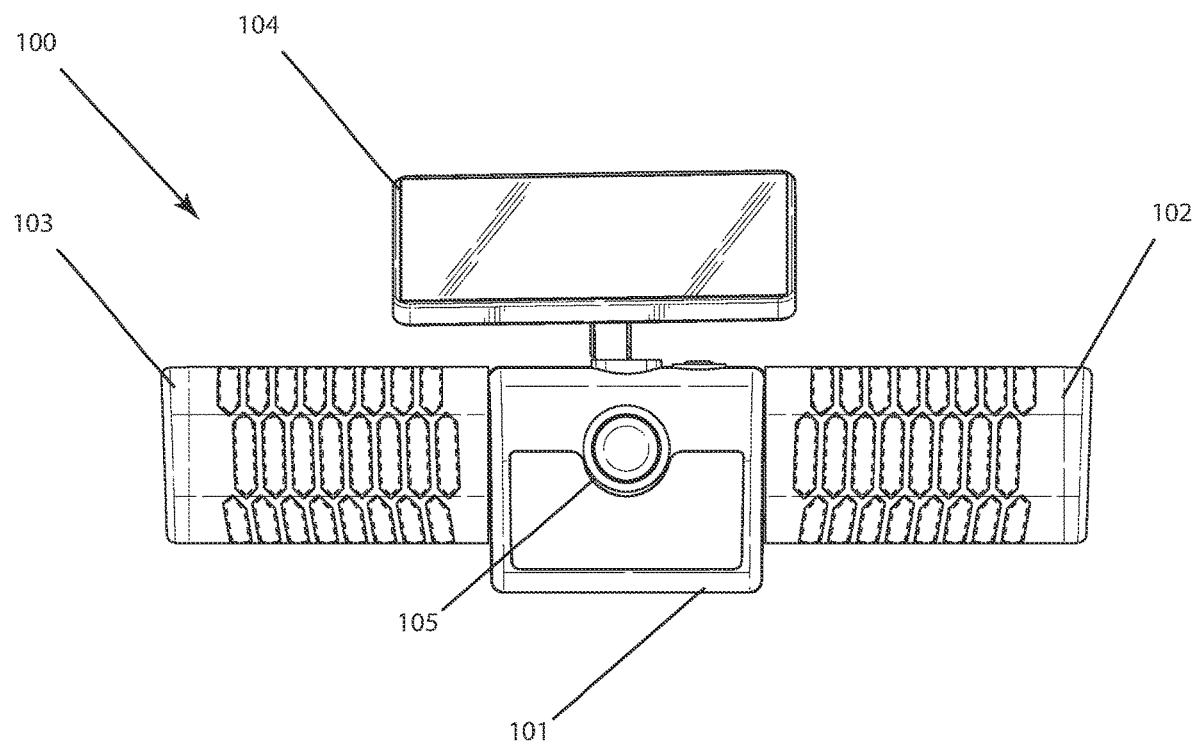
FIG. 2 is a front elevational view thereof.
Figure 3:
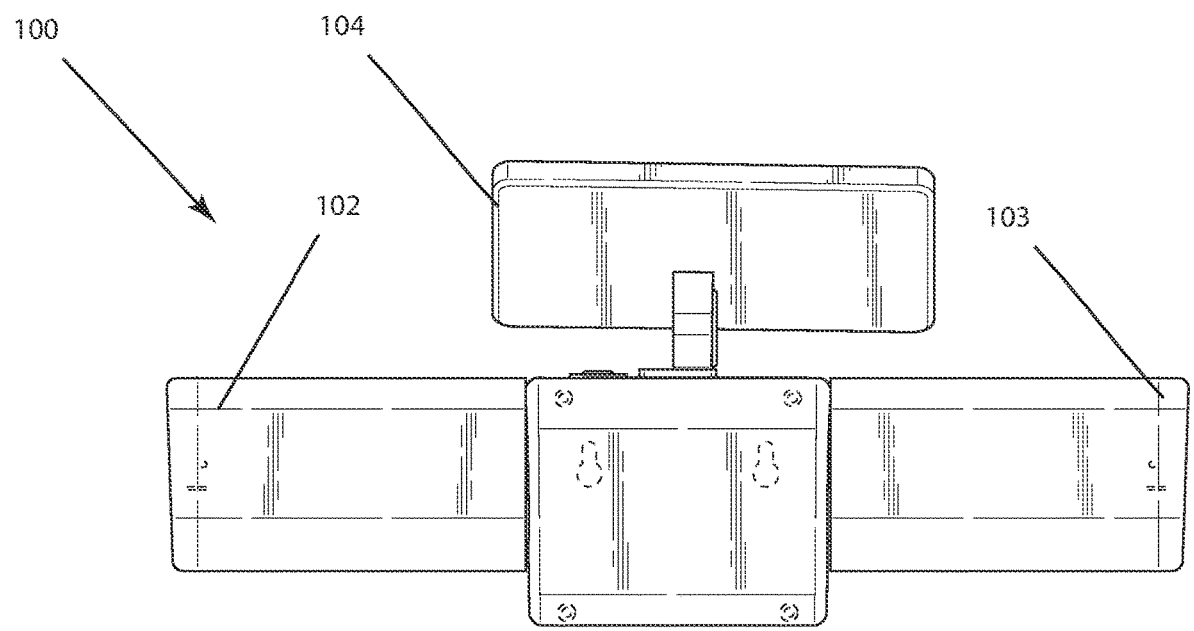
FIG. 3 is a rear elevational view thereof.
Figure 4:
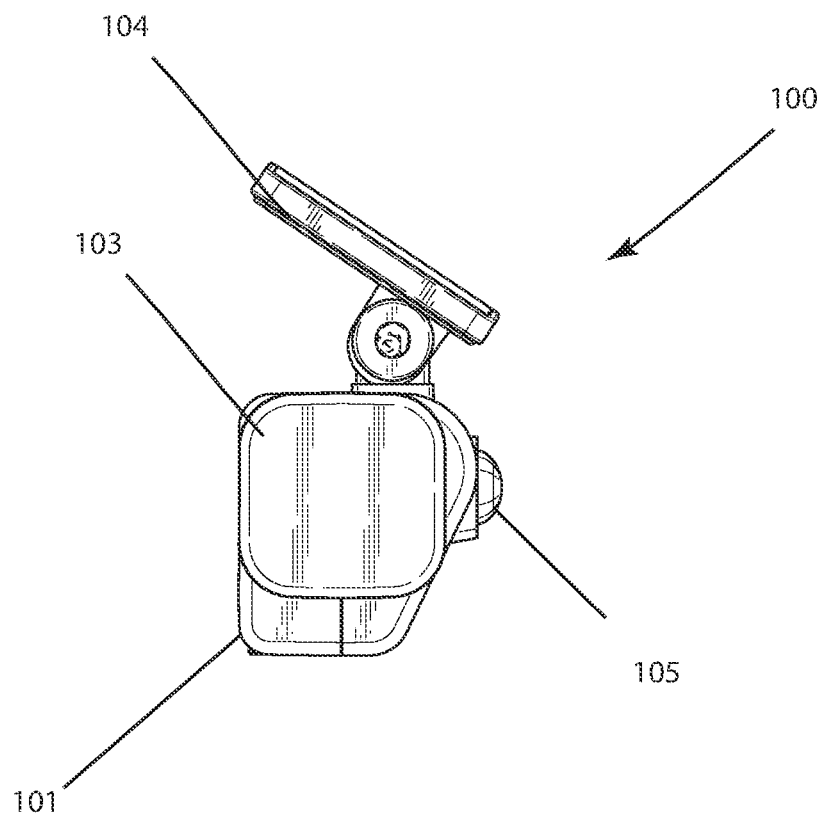
FIG. 4 is a rear elevational view thereof.
Figure 5:
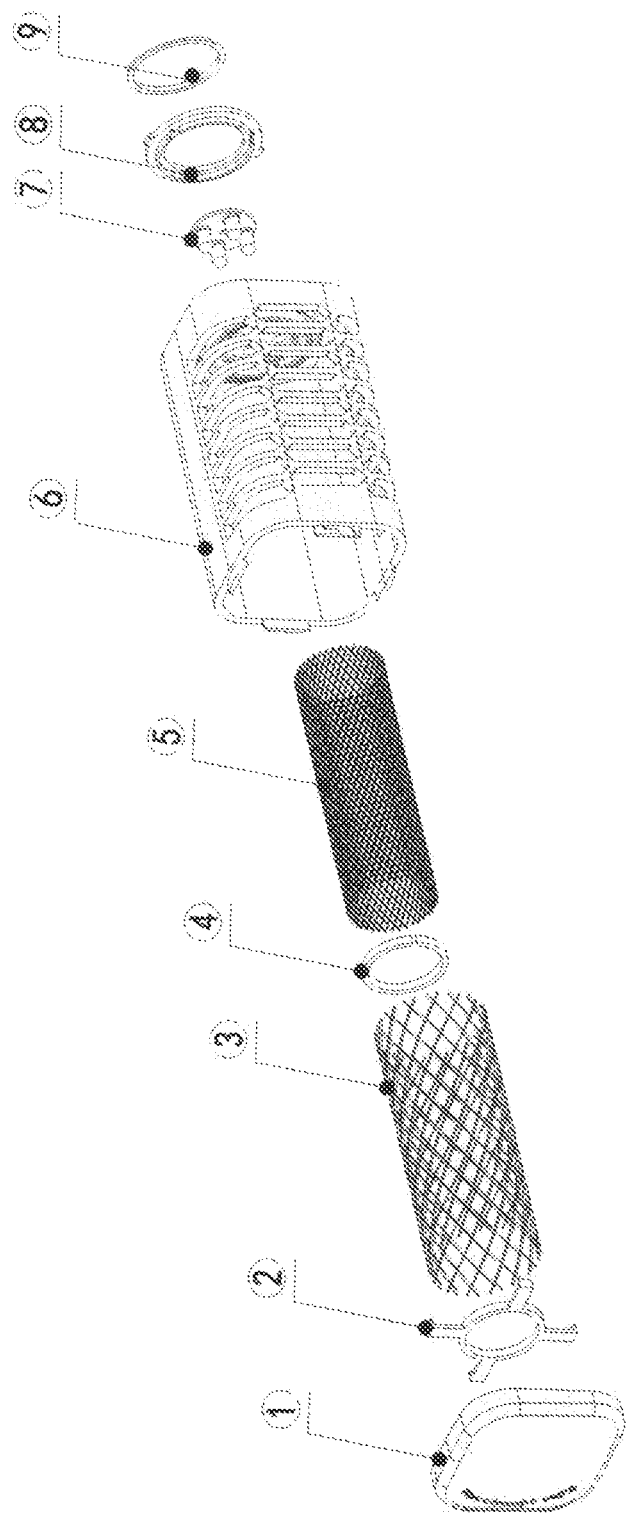
FIG. 5 is an exploded view of the right trap extension thereof.
Figure 6:
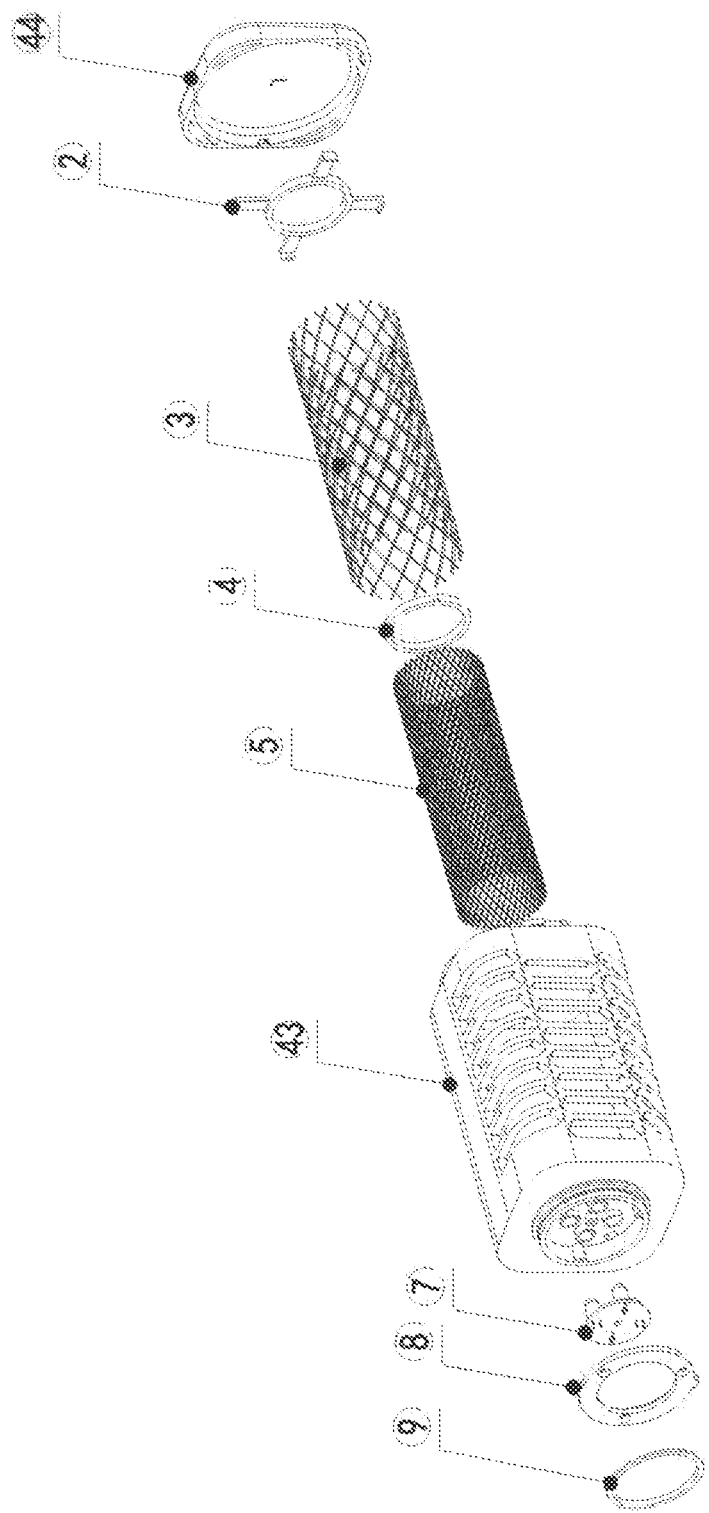
FIG. 6 is an exploded view of the left trap extension thereof.
Figure 7:
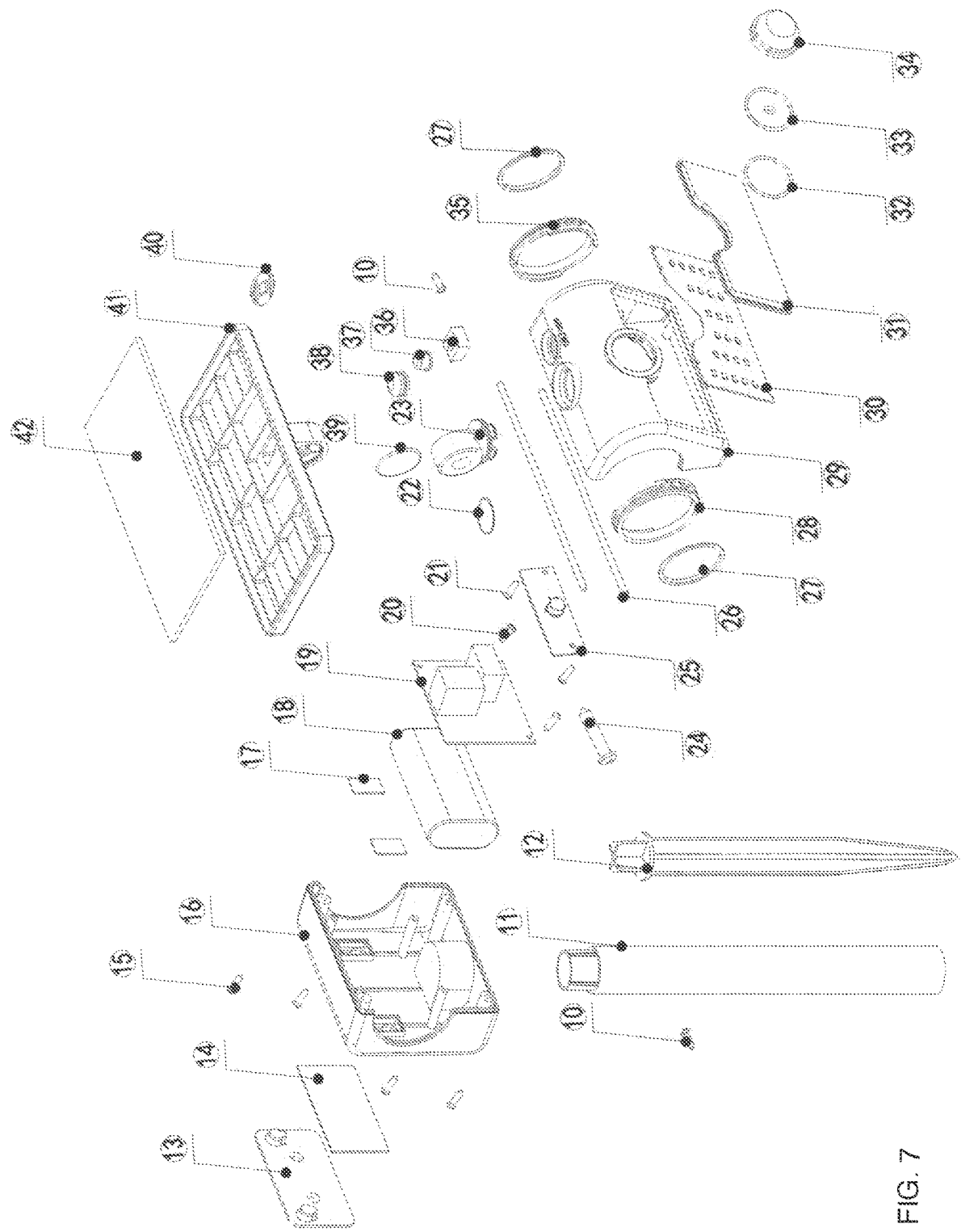
FIG. 7 is an exploded view of the main body thereof.
Figure 8:
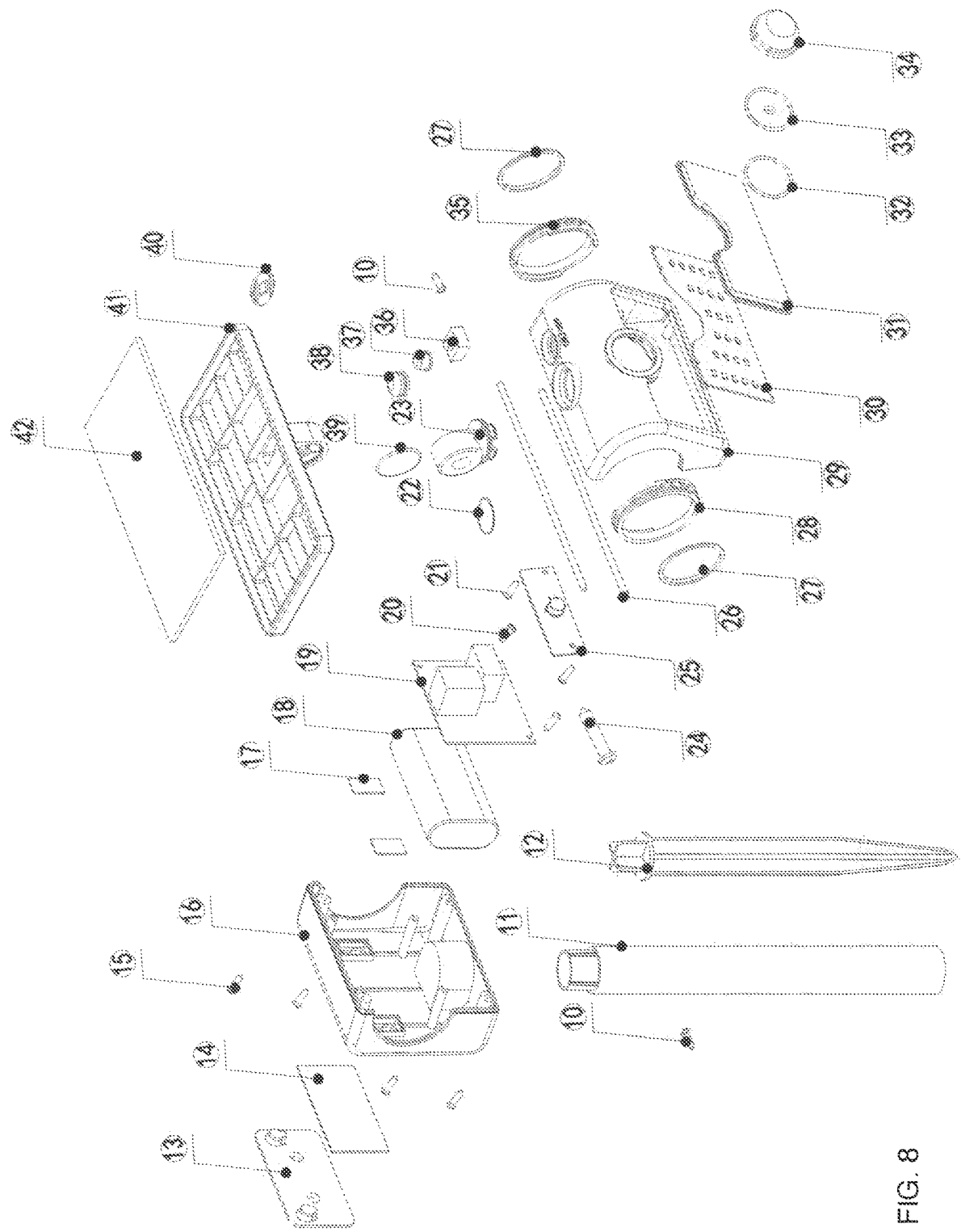

According to a non-limiting embodiment of the subject technology, shown for example in FIGS. 1-7, device 100 combines the functionality of a solar spotlight or lamp and an electric insect control trap.

Device 100 has a main body or main housing 101, which is hollow to house components of the device 100, a solar cell support 104 pivotably attached to the top of the main body 101, the support 104 being generally planar and containing solar cells for harvesting solar energy and thereby recharging a rechargeable battery housed within the main body 101 to power the electronic functions of device 100, and also for detecting a level of ambient light.

A transparent panel or lens 31 at the front center of the main body 101 is disposed over a printed circuit board (PCB) 30 within main body 101, on which PCB are disposed a plurality of high-power LEDs for illumination. A motion detector or occupancy detector 105, as is known in in security lighting products, is disposed at the front of the main body 101, beneath a sensor cap 34 received in a notch formed in lens 31.

One, two, or more insect control extensions 102, 103 are attached to the main body 101. The attachment to the main body 101 may be rotatable so the extensions 102, 103 are rotatably disposed on body 101. The rotatable connection between extensions 102, 103 and main body 101 may be via annular or hollow couplers 28, 35. In an embodiment, extension 102 is disposed on a left side of body 101, and extension 103 is disposed on the right side of body 101 (more generally, extensions are attached at opposite sides of the main body). Each insect control extension 102, 103 contains structure for attracting and destroying insects. In an embodiment, said structure is an electrified high-voltage grid and associated UV-emitting LEDs. The insect control structures are electrically and operatively connected to the wiring and device electronics, and rechargable battery 18, housed in housing 101. In a non-limiting embodiment, a two-part grid made of an external grid 3 and internal grid 5. The grids 3, 5 are made of non-insulated metal wires, i.e., a hot wire and a cold wire, and are disposed on and supported by grid supports 2, 4, which in turn are disposed within grid covers 6, 43. Grids 3, 5 are not contacting each other electrically. Light sources 7, which may be 1 to 4 or more light-emitting diodes disposed on a side of a flat printed circuit board, are disposed within grid covers 6, 43. Grid covers 6, 43 have grilles formed therein which cover the grids 3, 5 to protect them against human contact but also to admit insects which will be destroyed upon encountering the electrified grids 3, 5. Grid covers 6, 43 have removable end caps 1, 44 on the end of the grid covers 6, 43 distal to the main body 101 for enabling the removal of insect debris.

In an embodiment, light sources 7 are disposed within inner grids 5 and at proximal ends of insect control extensions 102, 103 (i.e., adjacent to main body 101). Light sources 7 are selected, driven and configured to emit light which is attractive of flying insects, for example, UV emitting LEDs. The light sources 7 are electrically and operatively connected to the wiring and device electronics housed in housing 101. When energized under control of the device electronics, the light sources 7 are powered and driven to emit insect-attracting light. The wiring and device electronics applies a high DC or AC voltage between external grid 3 and inner grid 5, which may be generated by, for example, a DC voltage multiplier circuit as is known in the art. The high-voltage may be 1 kV, 1.5 kV, 2 kV, 2.5 kV, or within the range of 1 kV-2.5 kV. The light emitted by the light sources 7 attract flying insects, which encounter the electrified grids 3, 5 and are destroyed by electrocution.

The electrical components of the device 100 (including button switch 36, grids 3, 5, UV LED(s) 7, illumination LED(s) 30, battery 18 and solar panels 42) are electrically and operably connected to control electronics disposed on control electronics PCB 25 within main housing 101 for control of the electrical functions of the components. Button switch 36 is disposed to manually switch device 100 between an OFF state and an ON state. In the OFF state, the grids 3, 5, insect-attracting LEDs 7, and illumination LEDs 30 are turned off. In the ON state, the grids 3, 5 and insect-attracting LEDs 7 are energized as described to attract and destroy insects. Also in the ON state, in an embodiment, if the solar cells 42 are detecting a low level of ambient light, the illumination LEDs 30 are turned on, otherwise they are turned off. In an embodiment, in the ON state, if the solar cells 42 are detecting a low level of ambient light, and also the motion sensor 105 has sensed motion within a predetermined time period (for example, one minute, five minutes, or ten minutes, or similar periods) the illumination LEDs 30 are turned on, otherwise they are turned off.

A removable landscape spike, which in an embodiment is a two-piece spike made of pole 11 and stake 12, is received in a socket on the bottom of the main body 101.

In the non-limiting embodiment show in the Figures, the components are as listed in the following TABLE 1.

TABLE 1

| Reference numeral | Description |
|---|---|
| 1 | left grid cover cap |
| 2 | grid support |
| 3 | external grid |
| 4 | grid support |
| 5 | inner grid |
| 6 | left grid cover |
| 7 | UV LEDs on PCB |
| 8 | frame |
| 9 | O-ring |
| 10 | screw |
| 11 | pole |
| 12 | stake |
| 13 | rear plate |
| 14 | cushion |
| 15 | screw |
| 16 | rear main housing |
| 17 | cushion |
| 18 | rechargeable battery |
| 19 | power supply PCB |
| 20 | screw |
| 21 | screw |
| 22 | O-ring |
| 23 | coupler |
| 24 | screw |
| 25 | control electronics PCB |
| 26 | seal |
| 27 | O-ring |
| 28 | coupler |
| 29 | front main housing |
| 30 | illumination LEDs on PCB |
| 31 | lens |
| 32 | O-ring |
| 33 | sensor cap base |

TABLE 1-continued

| Reference numeral | Description |
|---|---|
| 34 | sensor cap |
| 35 | coupler |
| 36 | button switch |
| 37 | button switch cap |
| 38 | button switch boot |
| 39 | O-ring |
| 40 | coupler |
| 41 | solar panel housing |
| 42 | solar panel |
| 43 | right grid cover |
| 44 | right grid cover cap |

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention.

What is claimed is:

1. A lamp comprising:
   A main body comprising a main housing;
   a rechargeable battery housed within lamp for powering the electronic functions of the lamp;
   device electronics housed within the lamp for controlling the electronic functions of the lamp in a plurality of states comprising an OFF state and an ON state;
   a support attached to the lamp, the support containing solar cells for harvesting solar energy and recharging the rechargeable battery and also for detecting a level of ambient light;
   a transparent panel at a front of the main body, the panel disposed over a printed circuit board (PCB) on which are disposed a plurality of high-power LEDs for illumination;
   one or more extension housings attached to the main body, each extension housing containing an inner grid and an outer grid for electrocuting insects and one or more insect-attracting lights for emitting insect-attracting wavelengths of light;
   a manual electrical switch disposed on the lamp for manually selecting a state from the plurality of states;
   the solar cells, rechargable battery, manual electrical switch, inner grid, outer grid, insect-attracting lights and high-power LEDs being electrically and operatively connected to the device electronics;
   wherein, when the OFF state is selected by the manual electrical switch, the inner grid, outer grid, insect-attracting lights and high-power LEDs are off, and
   wherein, when the ON state is selected, the inner grid, outer grid, and insect-attracting lights are on, and if the solar cells are detecting a level of ambient light below a predetermined level, the high-power LEDs are also on.

2. The lamp of claim 1 further comprising:
   a motion detector disposed on the lamp for detecting motion, the motion detector electrically and operably connected to the device electronics.

3. The lamp of claim 1 wherein the one or more extension housings are rotatably attached to the main body.

4. The lamp of claim 1 wherein the support is pivotably attached to a top of the main body.

5. The lamp of claim 1 wherein the rechargeable battery and device electronics are housed in the main housing.

6. A lamp kit comprising the lamp of claim 1 and a landscape spike receivable in a socket of the lamp for staking the lamp to the ground.

\* \* \* \* \*